United States Patent

Momochi et al.

[11] Patent Number: 6,089,799
[45] Date of Patent: Jul. 18, 2000

[54] SURFACE FINISHING METHOD AND MACHINE FOR THE SAME

[75] Inventors: Takeshi Momochi, Numazu; Masahito Shiozaki, Niigata; Toshihiro Ueta, Mishima, all of Japan

[73] Assignee: Toshiba Kikai Kabushiki Kaisha, Tokyo, Japan

[21] Appl. No.: 09/210,587

[22] Filed: Dec. 14, 1998

[30] Foreign Application Priority Data

Dec. 17, 1997 [JP] Japan .................................. 9-347720

[51] Int. Cl.⁷ ....................................................... B23C 3/00
[52] U.S. Cl. ............................ 409/132; 409/80; 409/191
[58] Field of Search ................................ 409/131, 132, 409/80, 190, 191, 199; 451/49, 57

[56] References Cited

U.S. PATENT DOCUMENTS

| | | | |
|---|---|---|---|
| 3,752,596 | 8/1973 | Weyand et al. ........................... | 408/234 |
| 4,016,855 | 4/1977 | Mimata ...................................... | 451/41 |
| 4,259,940 | 4/1981 | Asano et al. .............................. | 451/435 |
| 4,268,999 | 5/1981 | Noto et al. ................................. | 451/6 |
| 4,569,326 | 2/1986 | Tanizaki et al. .......................... | 451/450 |
| 4,621,407 | 11/1986 | Suzuki ....................................... | 408/35 |
| 4,632,615 | 12/1986 | Yamamura ................................ | 409/235 |
| 4,850,761 | 7/1989 | Breuer et al. ............................. | 409/132 |
| 4,869,626 | 9/1989 | Kosmowski .............................. | 408/129 |
| 5,078,558 | 1/1992 | Arai et al. ................................. | 409/233 |
| 5,108,236 | 4/1992 | Arai et al. ................................. | 409/163 |
| 5,125,775 | 6/1992 | Breuer et al. ............................. | 409/132 |
| 5,378,091 | 1/1995 | Nakamura ................................ | 409/132 |
| 5,688,084 | 11/1997 | Fritz et al. ................................. | 409/202 |

*Primary Examiner*—Steven C. Bishop
*Attorney, Agent, or Firm*—Oliff & Berridge, PLC

[57] ABSTRACT

A surface finishing method and a machine therefor, in which good finish accuracy can be obtained in all carving surfaces and deterioration of tool's life can be prevented. When a surface of a concave portion formed on a workpiece is carved, an end mill is first revolved along an outermost side of a slope, and is moved toward inside and revolved along a circumferential direction. When a surface of the slope is carved, a movement path of the end mill is selected so that the surface of the slope is down-cut. When a bottom is carved, the end mill is moved from inside to outside, in other words, the movement path is selected so that a surface of the bottom is down-cut.

3 Claims, 8 Drawing Sheets

FIG. 8 (A) PRIOR ART
UP-CUT
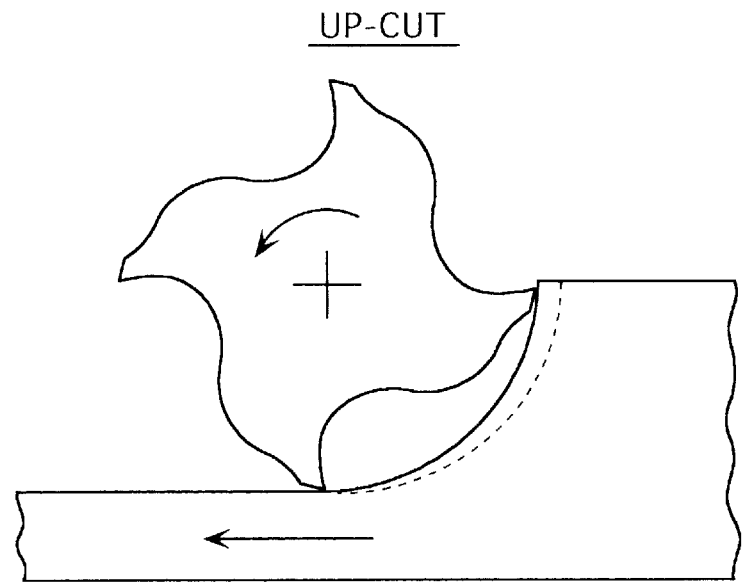
FIG. 8 (B) PRIOR ART
DOWN-CUT
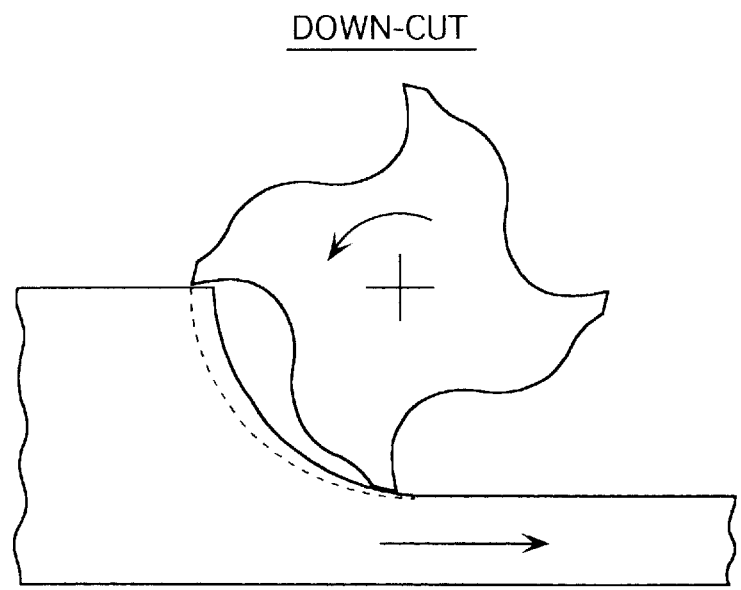

SURFACE FINISHING METHOD AND MACHINE FOR THE SAME

BACKGROUND OF THE INVENTION

1. Field of the Invention

The present invention relates to a surface finishing method and a machine for the method, in which a rotary tool is employed to finish a surface of a workpiece having a bottom and a slope continuing thereto. More specifically, the present invention relates to a surface finishing method for finishing a surface of a concave or convex portion of which profile is carved to a mold material using an end mill or the like, and a machine for implementing the method.

2. Description of Related Art

Conventionally, when a surface of, for example, a concave portion of which profile is carved to a workpiece is finished using a rotary tool such as an end mill, the surface is ordinarily carved while the end mill is revolved along a side of the concave portion and is moved gradually from an outermost side to an inner side of the concave portion. Subsequently, the end mill is moved to a bottom of the concave portion through the same movement path and the bottom is finished.

For instance, as shown in FIG. 7, when a surface of a workpiece W having a bottom 101 and a slope 103 provided successively to the bottom 101 at an obtuse angle through a slope 102, an end mill EM is first revolved along an outermost side of the slope 103 (counterclockwise in FIG. 7) to carve the surface of the workpiece W. Subsequently, the end mill EM is moved toward inner side of the slope 103 at a predetermined amount and the surface is carved again while the end mill is revolved along the slope 103. In this way, the end mill EM is gradually moved toward inside to carve the surface. The successive bottom 101 is also carved toward inner side of the bottom 101 by repeating similar movement.

However, an up-cut (cutting upward) and a down-cut (cutting downward) can be co-existed in the above conventional carving method on account of a relation between the relative movement path of the end mill EM and the workpiece W and the revolving direction (moving direction on the surface) of the end mill EM.

More specifically, the surface is down-cut (cutting downward) when the end mill EM is revolved along a side of the slope 103 to carve the surface of the workpiece in FIG. 7, since the end mill EM touches the workpiece W in a far side in the figure and a relative movement direction of a surface of the workpiece W relative to end mill EM and revolving direction (moving direction on the surface) is equal.

On the other hand, the surface is up-cut (cutting upward) when the bottom 101 is carved, since the workpiece W is carved sequentially toward inside of the concave portion and the end mill EM touches the workpiece W at a front side of the tip end of the end mill EM in the figure, thereby making the relative moving direction of the surface of the workpiece W relative to the end mill EM opposite to the revolving direction (moving direction on the surface) of the end mill EM.

When the up-cut (cutting upward) and the down-cut (cutting downward) co-exist, it is difficult to secure sufficient finish surface accuracy in all of the carved surfaces and the tool's life span can be decreased.

Generally speaking, following difference can be observed between the up-cut and the down-cut.

As shown in FIG. 8(A), in conducting the up-cut (cutting upward), the edge initially touches a surface which has been carved and gradually cuts uncarved portion, in other words, a swarf thickness in conducting the up-cut (cutting upward) starts from zero and increases gradually. In this case, when the workpiece is begun to be carved, it is impossible to cut the workpiece and the edge just rubs the surface of the workpiece since the swarf thickness, i.e. the amount by which the edge cut the workpiece, is zero. When the swarf thickness gets sufficiently large, the workpiece is substantially carved. During the time, the edge is rubbed on the surface of the workpiece with a certain amount of pressure being applied, which causes abrasion of edges and burn on the surface of the workpiece.

On the other hand, as shown in FIG. 8 (b), the edge in conducting down-cut (cutting downward) first greatly cut into an uncarved portion and gradually decreases cutting amount, in other words, a swarf thickness in conducting the down-cut (cutting downward) is the greatest at the beginning of cutting and is decreased gradually. Though the swarf thickness is zero at a final carving stage, the edge moves to separate from the workpiece and scarcely rubs the surface of the workpiece, thereby hardly causing edge abrasion and burn on the surface of the workpiece.

Therefore, the up-cut (cutting upward) is shorter in tool's life and is more likely to cause grinding burn than the down-cut (cutting downward). So, when the up-cut (cutting upward) and the down-cut (cutting downward) coexist in a workpiece as in a conventional carving method, it is difficult to obtain good finish surface accuracy in all of the carving surfaces and the tool's life is shortened.

SUMMARY OF THE INVENTION

The object of the present invention is to solve aforesaid problems, that is, to provide a surface finishing method and surface finishing machine which can obtain a good finish surface accuracy in all the finishing surfaces and curb the decrease in tool's life.

A method according to the present invention is for finishing a surface of a workpiece having a bottom and a slope continued from the bottom using a rotary tool. The method is characterized in that a relative movement path of the rotary tool and the workpiece is changed so that the slope and the bottom is always carved by down-cut in carving both of the slope and the bottom.

Specifically, the relative movement path of the rotary tool and the workpiece is selected so that the slope and the bottom is always carved by down-cut and the bottom and the slope are carved along the relative movement path.

Preferably, the rotary tool and the workpiece are relatively movable in three-dimensional directions (X, Y and Z-axis direction orthogonal with each other). The rotary tool is, for instance, an end mill and a milling cutter and the like. The relative movement path refers to a path including any relative movement directions of the rotary tool and the workpiece.

Since the workpiece is always down-cut by the rotary tool in carving both the slope and the bottom, a good finish surface accuracy can be obtained in all the carving surfaces and the decrease in tool's life span caused by up-cut (cutting upward) can be considerably curbed as compared to a conventional method where the up-cut (cutting upward) and the down-cut (cutting downward) are coexisted.

In the above, following steps can be used for changing the relative movement path of the rotary tool and the workpiece so that the slope and the bottom are always down-cut.

In carving the slope the rotary tool and the workpiece are relatively moved so that the rotary tool is moved approximately parallel to a ridgeline between the slope and the bottom and so that the rotary tool is gradually moved to approach the ridgeline from a position remote therefrom. On the other hand, in carving the bottom the rotary tool and the workpiece are relatively moved so that the rotary tool is moved approximately parallel to a ridgeline between the slope and the bottom and so that the rotary tool is gradually moved to approach the ridgeline from a position remote therefrom.

In other words, when the slope and the bottom are carved, the rotary tool and the workpiece are relatively moved so that the rotary tool is moved approximately parallel to the ridgeline between the slope and the bottom (in the same direction) and in a direction to approach the ridgeline.

Alternatively, when the slope is carved, the rotary tool may be moved in a direction to approach the ridgeline and revolved counterclockwise relatively to the workpiece to down-cut. And the rotary tool may be moved in a direction away from the ridgeline and revolved clockwise relatively to the workpiece to down-cut when the bottom is carved. In other words, only the revolving direction may be made opposite.

Incidentally, when the slope and the bottom of the workpiece are provided successively with a curve extending therebetween, the curve ordinarily cannot be down-cut entirely, because, for instance, if the slope is continuously carved by down-cut, the slope comes to be up-cut as the rotary tool approaches a side of the slope touching the bottom. On the contrary, when the bottom side is continuously carved by down-cut to approach the ridgeline between the slope and the bottom, the bottom comes to be up-cut as thee rotary tool approaches a side of the bottom touching the slope.

Accordingly, the relative movement path of the rotary tool and the workpiece may be changed in carving the slope and in carving the bottom so that the workpiece is always down-cut, and, when the curve is carved, divide the curve into a slope side area and a bottom side area approximately at a border according to an angle bisecting a touching surface of the workpiece with the rotary tool into a down-cut area and an up-cut area to carve the slope side area in succession to carving the slope and carve the bottom side area in succession to carving the bottom.

Specifically, the relative movement path of the rotary tool and the workpiece may be selected so that the slope and the bottom is always carved by down-cut, the curve may be divided into a slope side area and a bottom side area approximately at a border according to an angle bisecting a touching surface of the workpiece with the rotary tool into a down-cut area and an up-cut area, the same relative movement path as in carving the slope may be selected to carve the slope side area and the same relative movement path as in carving the bottom may be selected to carve the bottom side area, and the slope, curve and the bottom may be carved in accordance with the selected relative movement path so that the slope side area of the curve is carved in succession to carving the slope and the bottom side area of the curve is carved in succession to carving the bottom.

Accordingly, the curve joining the bottom and the slope can be carved with down-cut, so that all the surface including the bottom, slope and the curve can be carved with down-cut.

A machine for finishing a surface of a workpiece according to the present invention has a table onto which a workpiece having a bottom and a slope continuing from the slope is set, a spindle head having a rotary tool, a machine body having the spindle head movably in three-dimensional directions and a controller for controlling a drive of the machine body. The machine is characterized in that the controller has a selector for selecting a relative movement path of the table and the spindle head so that the slope and the bottom are always down-cut when the surface of the workpiece is carved.

Accordingly, aforesaid advantage of the profile processing method, that is, obtaining a good finish surface accuracy of all the carving surfaces and curbing the decrease in the tool's life span can be attained in the above configuration. Furthermore, since the relative movement path of the rotary tool and the workpiece is automatically selected so that the workpiece is always down-cut by the rotary tool, the workpiece can be processed efficiently.

BRIEF DESCRIPTION OF THE DRAWINGS

FIG. 8(A) is an illustration of up-cut; and

FIG. 8(B) is an illustration of down-cut.

DETAILED DESCRIPTION OF PREFERRED EMBODIMENT(S)

A preferred embodiment according to the present invention will be described below with reference to the attached drawings.

Figure 1:
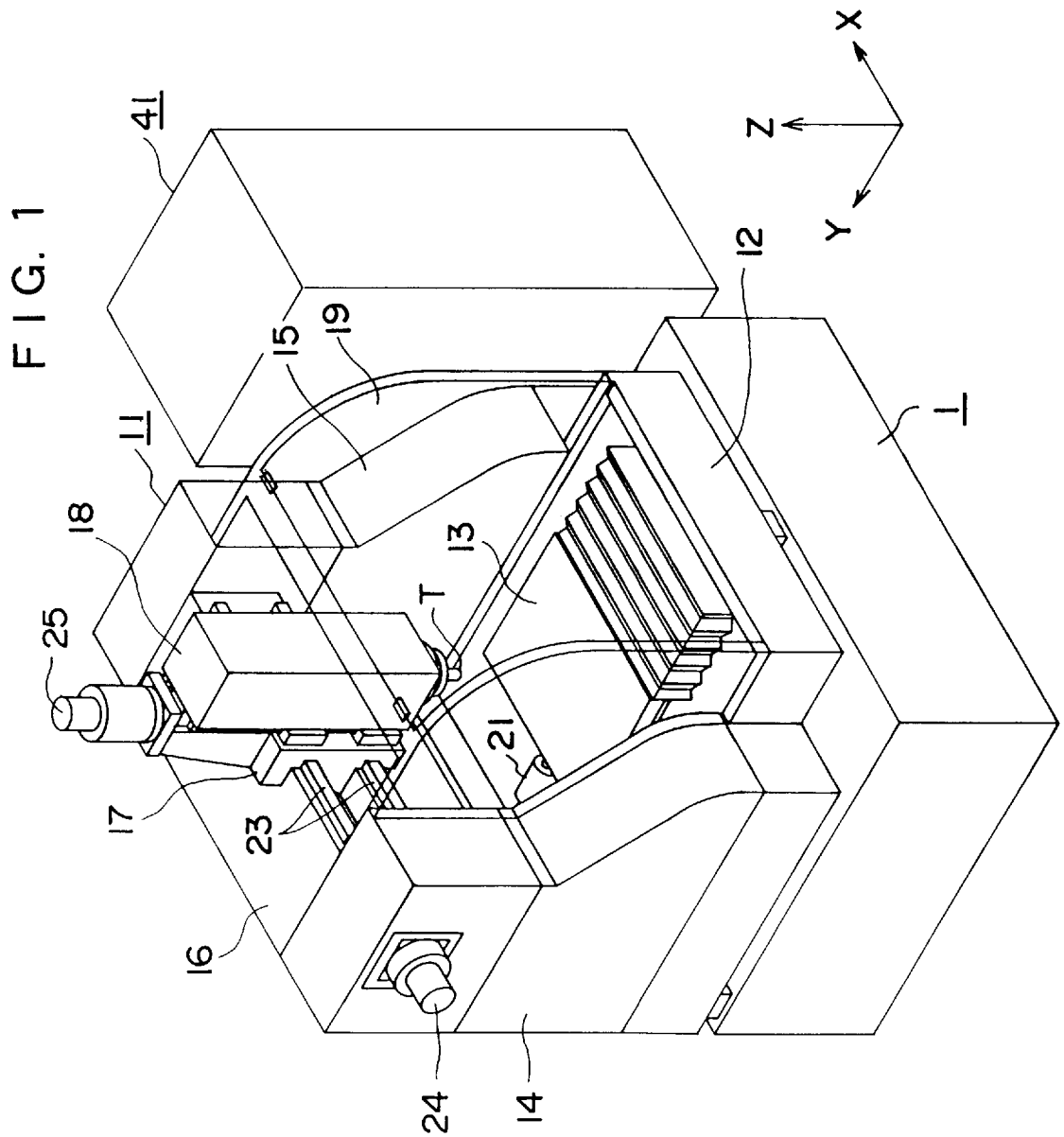
FIG. 1 is a perspective view showing a preferred embodiment of a processing machine according to the present invention.

FIG. 1 is a perspective view showing a processing machine on which a profile processing method according to the present invention is applied. As shown in FIG. 1, the processing machine according to the present embodiment is a machine tool controlled by a NC device, and has a base 1, a machine body 11 mounted on the base 1 and a NC device 41 as a controller for controlling the drive of the machine body 11.

The machine body 11 is composed of a bed 12 mounted on the upper side of the base 1 through a leveler or the like, a table 13 provided on an upper side of the bed 12 movably in back and forth direction (Y-axis direction), a pair of column 14 and 15 erectly set on both side of the bed 12, a cross rail 16 stretched between upper portions of the columns 14 and 15, a slider 17 provided along the cross rail 16 movably in right and left direction (X-axis direction), a spindle head 18 provided elevatably in up and down direction (Z-axis direction), and a splash guard 19 which covers a front part between the column 14 and 15, of which inside is visible and which can be opened and closed in up and down direction with the upper end thereof as a fulcrum.

The bed 12 has a Y-axis driving mechanism 21 which moves the table 13 in Y-axis direction accompanied by a guide (not shown) for guiding the table 13. A feed screw mechanism consisting of a motor and a feed screw shaft rotated by the motor is employed as the Y-axis driving mechanism 21.

The side shape of the respective columns 14 and 15 is configured approximately triangle having wider bottom portion than upper portion. Accordingly, the bottom portion is stable enough to decrease generating a vibration even when a high-speed rotating spindle head 18 is used.

The cross rail 16 has two guide rail, 23 for movably guiding the slider 17 as well as X-axis driving mechanism 24 for moving the slider 17 in X-axis direction.

The slider 17 has a guide (not shown) for guiding the spindle head 18 in Z-axis direction as well as a Z-axis driving mechanism 25 for elevating the spindle head in Z-axis direction. As in the Y-axis driving mechanism 21, the driving mechanisms 24 and 25 also employ a feed screw mechanism composed of a motor and a feed screw shaft rotated by the motor.

Figure 2:
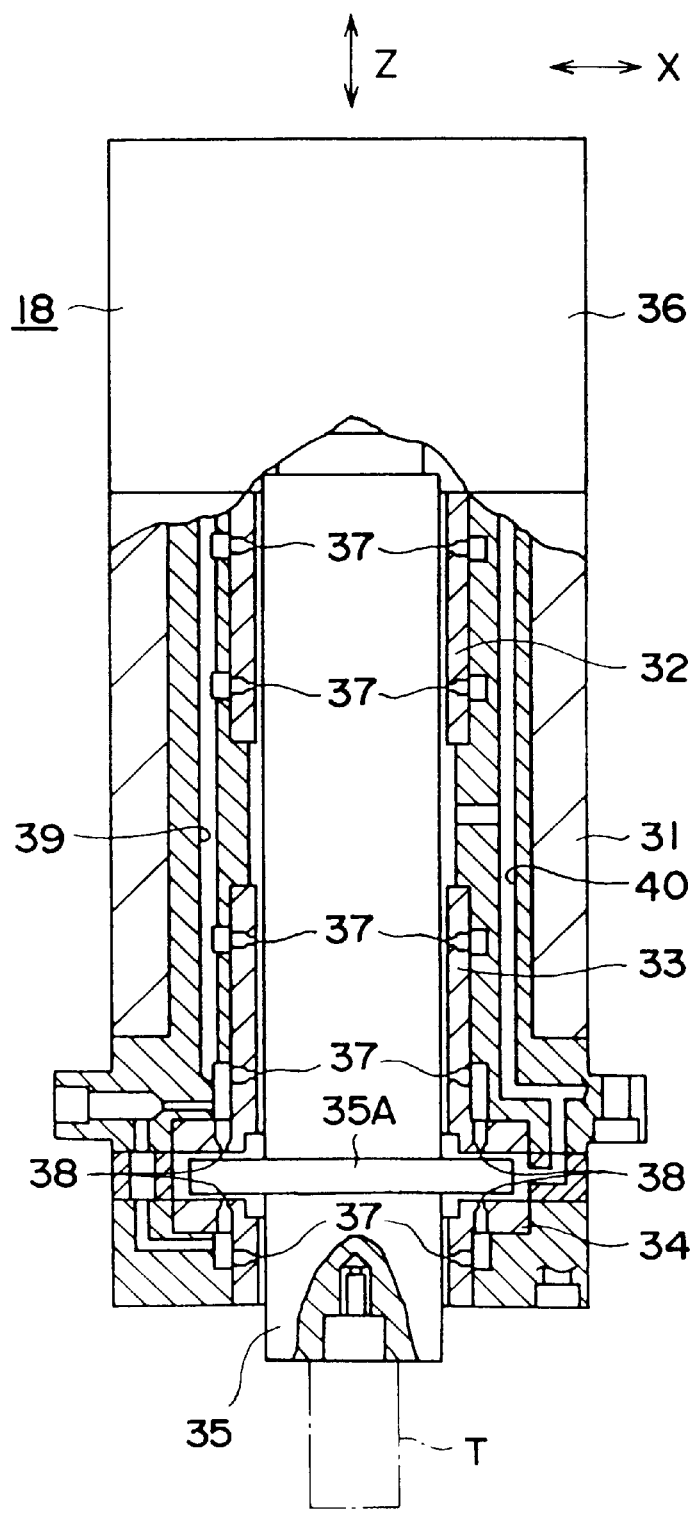
FIG. 2 is a cross-section of a spindle head according to the aforesaid embodiment.

As shown in FIG. 2, the spindle head 18 is composed of an air-bearing supported spindle head. More specifically, the spindle head 18 is composed of an air-bearing supported spindle head having a housing 31 elevatably provided to the cross rail 16 elevated by the Z-axis driving mechanism 25, a spindle 35 supported in parallel to Z-axis direction to the housing 31 rotatably through the air-bearings 32, 33 and 34 and having a fringe 35A in the halfway thereof, and a motor 36 for rotatively driving the spindle 35. The spindle 35 can be rotated at a high-speed of 30,000 to 50,000 rpm.

A plurality of air-blowing holes 37 which blow air toward the spindle 35 in a direction perpendicular to the axis of the spindle are formed on an inner side of the respective air-bearings 32, 33 and 34. The air blown by the air-blowing holes 37 forms a radial bearing for supporting the spindle 35 in a radial direction. Another plurality of air-blowing holes 38 which blow air toward the fringe 35A of the spindle 35 are formed on an end side of the respective air-bearings 33 and 34 respectively opposing in axis-direction. The air blown by the air-blowing holes 38 forms a thrust bearing for supporting the spindle 35 in a thrust direction. Incidentally, in FIG. 2, 39 is an air-supply passage for providing air to the respective air-blowing holes 37 and 38, 40 is an air-outlet passage and T is a rotary tool such as an end mill.

Figure 3:
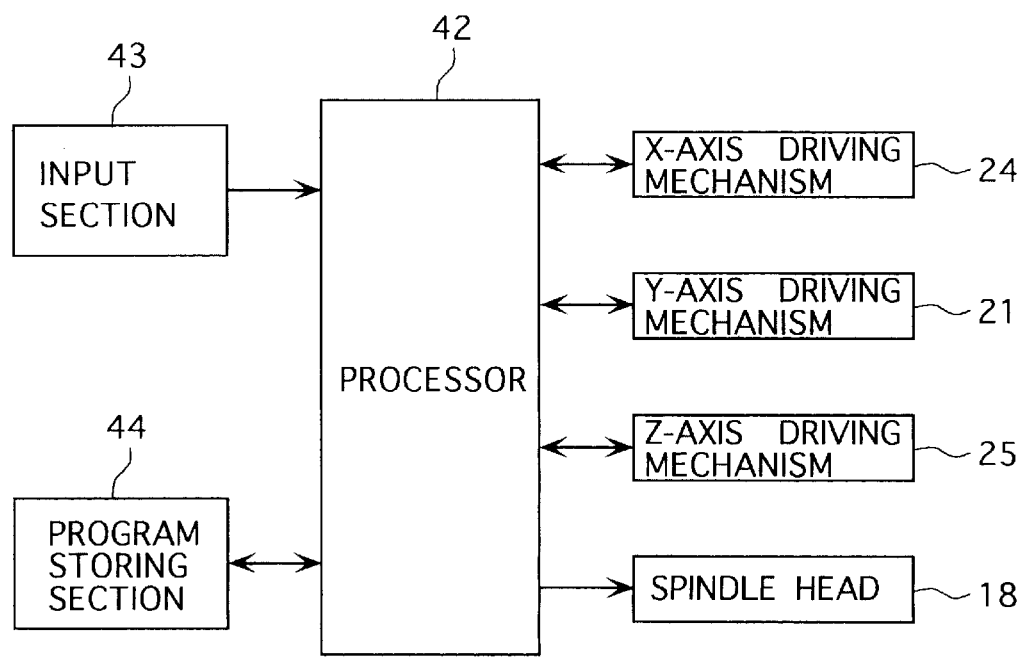
FIG. 3 is a block diagram showing a NC device and a driving mechanism according to the aforesaid embodiment.

As shown in FIG. 3, the NC device has a processor 42. To the processor 42, an input section 43 and a program storing section 44 for storing a program input through the input section 43 is connected as well as the driving mechanisms 21, 24 and 25 and the spindle head 18. The processor 42 has a selector for selecting a relative movement path of the rotary tool T and a workpiece so that the workpiece is always down-cut by the rotary tool T in processing a profile of a concave portion and a convex portion onto the workpiece in accordance with a program set and stored to the program storing section 44 in advance. In other words, the processor 42 has a driver for driving the X, Y and Z-axis driving mechanisms so that the workpiece is always down-cut.

The selector for selecting the relative movement path may be software or the like installed in the processor 42. As to specific steps, the selector first determines in which direction the workpiece should be up-cut or down-cut in respective processing path based on a information such as a direction of an edge of the rotary tool T, processing direction set on the processing program and processing path. Consequently, a direction in which the workpiece is down-cut is selected.

After selecting the direction in which the workpiece is always down-cut in the respective movement path, the program may be reconstructed so that the respective processing path should be effectively continued.

Figure 4:
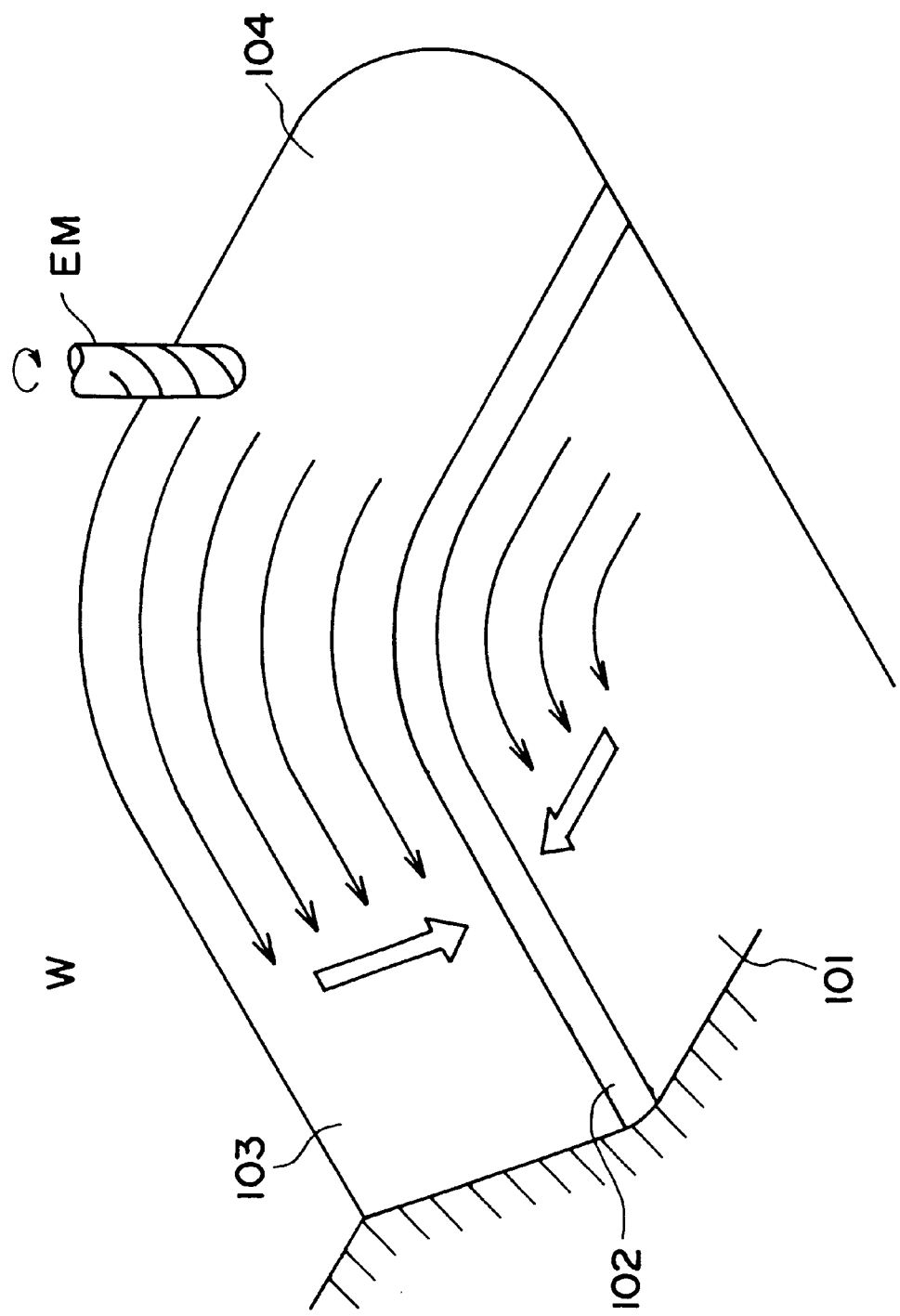
FIG. 4 is an illustration showing a movement path of a tool in carving a concave portion in the aforesaid embodiment.
Figure 5:
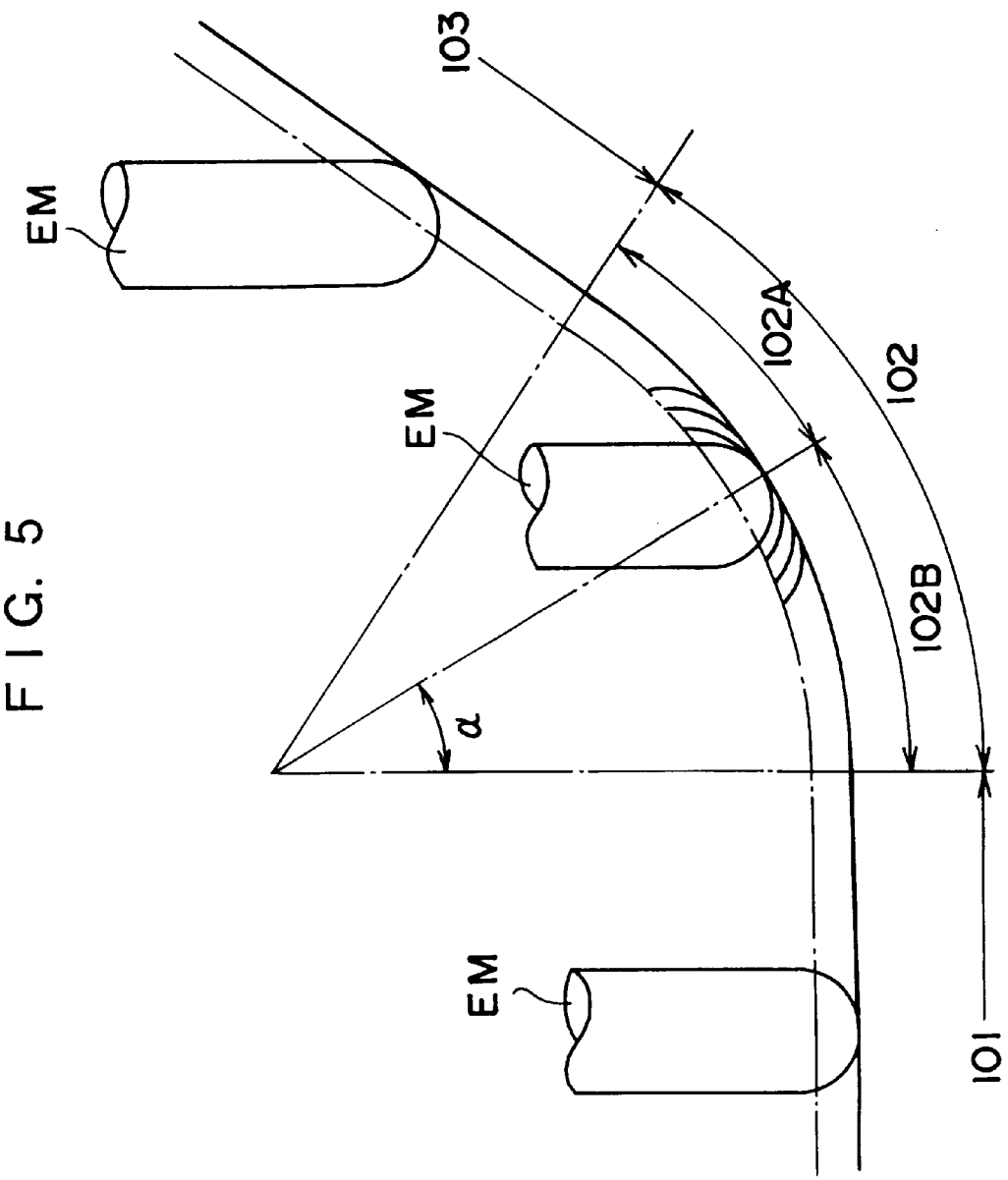
FIG. 5 is an enlarged view of a part of the FIG. 4.

The effect of the present embodiment will be described below with reference to FIG. 4 and 5.

The workpiece is carved by the rotary tool T attached to the spindle 35, while the table 13 and the spindle head 18 are relatively moved in X, Y and Z-axis direction by a command from the NC device 41. In other words, the table 3 is moved in Y-axis direction by the Y-axis driving mechanism 21 and the spindle head 18 is moved in X and Z-axis direction by the X-axis driving mechanism 24 and the Z-axis driving mechanism 25.

When the surface of the workpiece W having a concave portion 104, that is, having a slope 103 extending at an obtuse angle around a bottom 101 through a curve 102 is carved, the slope 103 and the bottom 101 are separately carved.

In carving the slope 103, the rotary tool, the end mill EM here, is moved on the slope 103 approximately parallel to a ridgeline between the slope 103 and the bottom 101 to approach the ridgeline from a position remote from the ridgeline. In other words, the rotary tool is relatively revolved along an outermost path of the slope 103. In this case, when the end mill EM is revolved clockwise in FIG. 4, the relative movement path of the end mill EM and the workpiece W is set counterclockwise. Accordingly, the slope 103 is carved by down-cut shown in FIG. 8(B) while the end mill EM is revolved along the slope 103 and moved toward inner side of the slope 102.

The workpiece is carved successively to the slope 103 by the same relative movement path until an intermediate portion of the curve 102. In other words, as shown in FIG. 5, a slope side area 102A divided approximately by a border in accordance with an angle α bisecting a touching surface of the workpiece W abutting the end mill EM into a down-cut area and an up-cut area is carved by the same relative movement path as in carving the slope 103 in succession thereto. Accordingly, the slope side area 102A of the curve 102 can also be carved by down-cut shown in FIG. 8 (B).

On the other hand, when the bottom 101 is carved, the end mill EM is moved on the bottom 101 approximately parallel to a ridgeline between the slope 103 and the bottom 101 (counterclockwise in FIG. 4) to approach from a position remote from the ridgeline toward the ridgeline. In other words, the rotary tool is relatively moved gradually from an inner side to outer side of the bottom 101. Accordingly, the bottom 101 is also carved by down-cut shown in FIG. 8(B)

The workpiece is carved by the same relative movement path until an intermediate portion of the curve 102 successively to the bottom 101. In other words, as shown in FIG. 5, a bottom side area 102B divided approximately by a border in accordance with an angle α bisecting a touching surface of the workpiece W abutting the end mill EM into a down-cut area and an up-cut area is carved by the same relative movement path as in carving the bottom 101 in succession thereto. Accordingly, the bottom side area 102B of the curve 102 can also be carved by down-cut shown in FIG. 8 (B).

In this way, all the carving surfaces can be carved by down-cut by changing the relative movement path of the end mill EM, so that good finish surface accuracy can be obtained and the decrease in tool's life can be curbed.

Figure 6:
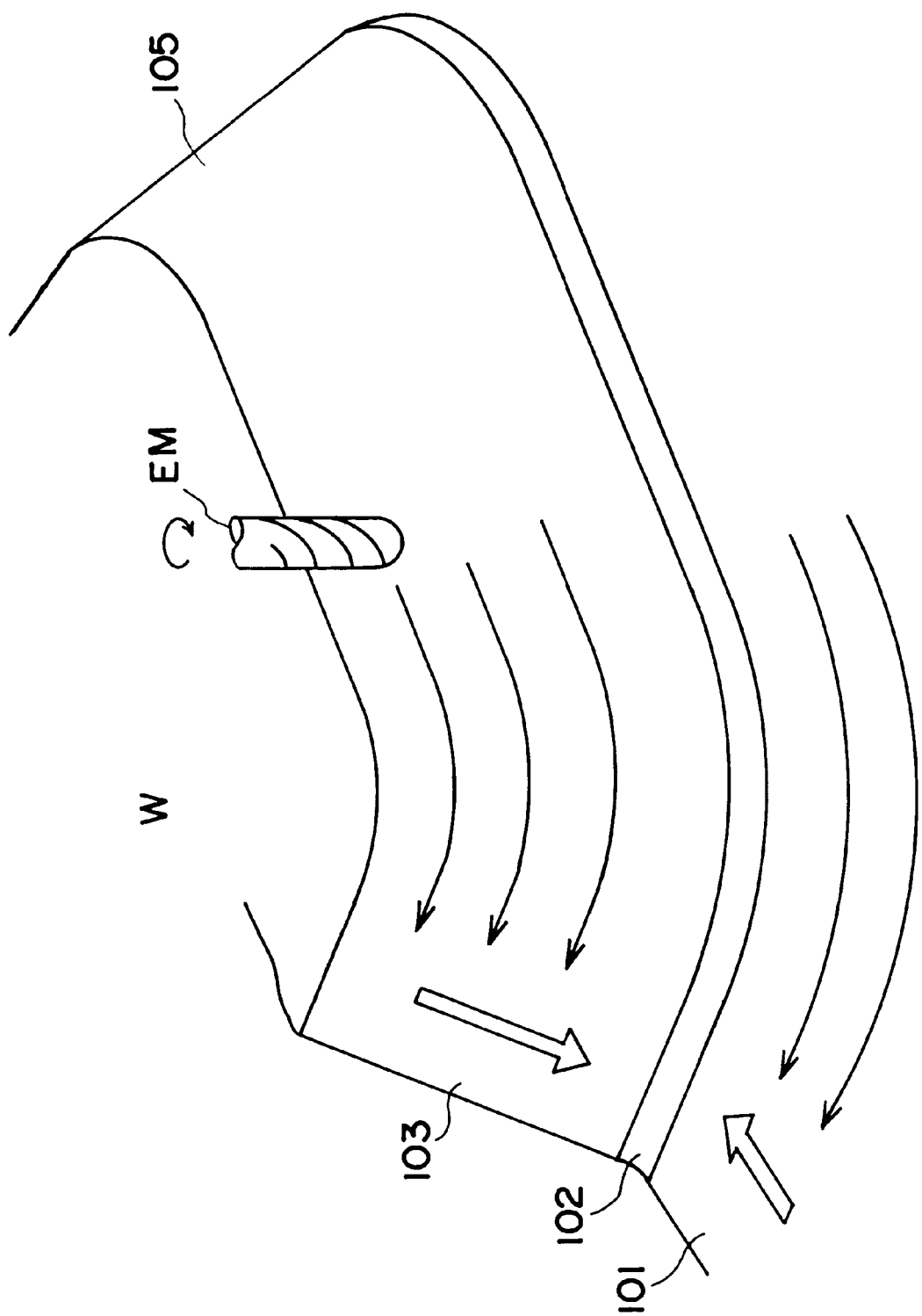
FIG. 6 is an illustration showing a movement path of a tool in carving a convex portion in the aforesaid embodiment.
Figure 7:
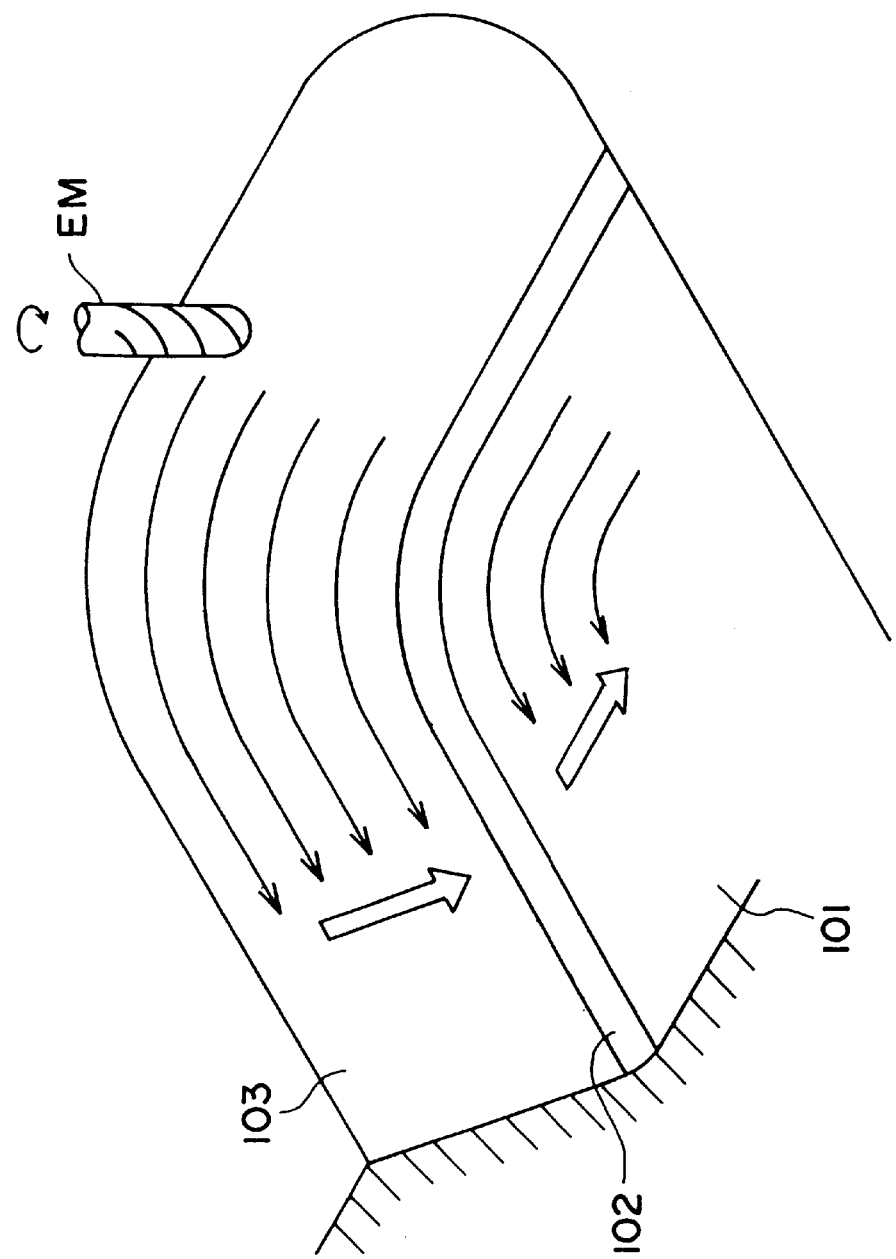
FIG. 7 is an illustration showing a movement path of a tool in carving a surface of a workpiece having a concave portion in a conventional processing method.

Incidentally, as shown in FIG. 6, the surface of the workpiece W having convex portion 105 can be processed similarly to the concave portion 104.

When the slope 103 is carved, the end mill EM and the workpiece W are relatively moved so that the end mill EM is moved on the slope 103 approximately parallel to a ridgeline between the slope 103 and the bottom 101 (revolved clockwise in FIG. 6) to approach from a position remote from the ridgeline toward the ridgeline.

When the bottom 101 is carved, the end mill EM and the workpiece W are relatively moved so that the end mill EM is moved on the bottom 101 approximately parallel to a ridgeline between the slope 103 and the bottom 101 (revolved clockwise in FIG. 6) to approach from a position remote from the ridgeline toward the ridgeline. Accordingly, all the carving surfaces can be carved by down-cut.

According to the present embodiment, since the relative movement path of the end mill EM and the workpiece W is changed in carving the slope 103 and in carving the bottom 101 to carve the workpiece W always by down-cut, good finish surface accuracy can be obtained and the decrease in tool's life can be curbed.

When the workpiece W having the bottom 101 and the slope 103 successively extending through the curve 102 is carved, the slope side area 102A of the curve 102 divided approximately by a border in accordance with an angle α bisecting a touching surface of the workpiece W abutting the end mill EM into a down-cut area and an up-cut area is carved by the same relative movement path as in carving the slope 103 in succession thereto, and the bottom side area 102B of the curve 102 is carved by the same relative movement path as in carving the bottom 101 in succession thereto, so that the curve 102 can also be carved by down-cut. Accordingly, all the surfaces including the bottom 101, slope 103 and the curve 102 can be carved by down-cut.

Since the spindle head 18 is an air-bearing supported spindle head having the spindle 35 supported by the air-bearings 32, 33 and 34, in other words, since a highly accurate high-speed rotation can be obtained by the air-bearing supported spindle head, the processing can be efficiently conducted with a great cutting feed speed.

In the above-described embodiment, the relative movement path of the end mill EM and the workpiece W is changed so that the workpiece W is always down-cut in carving the slope 103 and the bottom 101. Accordingly, for example, when the slope 103 in FIG. 4 is carved by the end mill EM revolved counterclockwise relatively to the workpiece W to down-cut, the bottom 101 may be revolved clockwise relatively to the workpiece W to down-cut.

In the above-described embodiment, the spindle head 18 is movable in X and Z-axis direction and the table 13 is movable in Y-axis direction. However, the present invention is not limited to the above structure but any structure can be adopted as long as the end mill EM (rotary tool T) and the workpiece W are relatively movable in three-dimensional directions (X, Y and Z-axis directions).

Though the spindle head 18 in the above-described embodiment is the air-bearing supported spindle head having a spindle rotatably supported by the air-bearings, the present invention is not limited to the above structure but a spindle head having a spindle supported rotatably by a ball bearing or the like can also be adopted.

What is claimed is:

1. A method for finishing a surface of a workpiece having a bottom and a slope continued from the bottom using a rotary tool, comprising the steps of:

selecting a relative movement path of the rotary tool and the workpiece so that the slope and the bottom are always carved by down-cut; and carving the bottom and the slope along the relative movement path;

wherein in carving the slope the rotary tool and the workpiece are relatively moved so that the rotary tool is moved approximately parallel to a ridgeline between the slope and the bottom and so that the rotary tool is gradually moved to approach the ridgeline from a position remote therefrom, and wherein in carving the bottom the rotary tool and the workpiece are relatively moved so that the rotary tool is moved approximately parallel to a ridgeline between the slope and the bottom and so that the rotary tool is gradually moved to approach the ridgeline from a position remote therefrom.

2. A method for finishing a surface of a workpiece having a bottom and a slope continued from the bottom through a curve using a rotary tool, comprising the steps of:

selecting a relative movement path of the rotary tool and the workpiece so that the slope and the bottom are always carved by down-cut;

dividing the curve into a slope side area and a bottom side area approximately at a border according to an angle bisecting a touching surface of the workpiece with the rotary tool into a down-cut area and an up-cut area;

selecting the same relative movement path as in carving the slope to carve the slope side area and the same relative movement path as in carving the bottom to carve the bottom side area; and carving the slope, curve and the bottom in accordance with the selected relative movement path, wherein the slope side area of the curve is carved in succession to carving the slope and the bottom side area of the curve is carved in succession to carving the bottom.

3. A machine for finishing a surface of a workpiece, comprising:

a table onto which a workpiece having a bottom and a slope continuing from the bottom is set;

a spindle head having a rotary tool;

a machine body having the spindle head movably in three-dimensional directions; and a controller for controlling a drive of the machine body, wherein the controller has a selector for selecting a relative movement path of the table and the spindle head so that the slope and the bottom are always down-cut when the surface of the workpiece is carved.

* * * * *